July 28, 1959 W. P. FRANKENSTEIN 2,896,834
CAKE LIFT
Filed Sept. 28, 1953 3 Sheets-Sheet 1
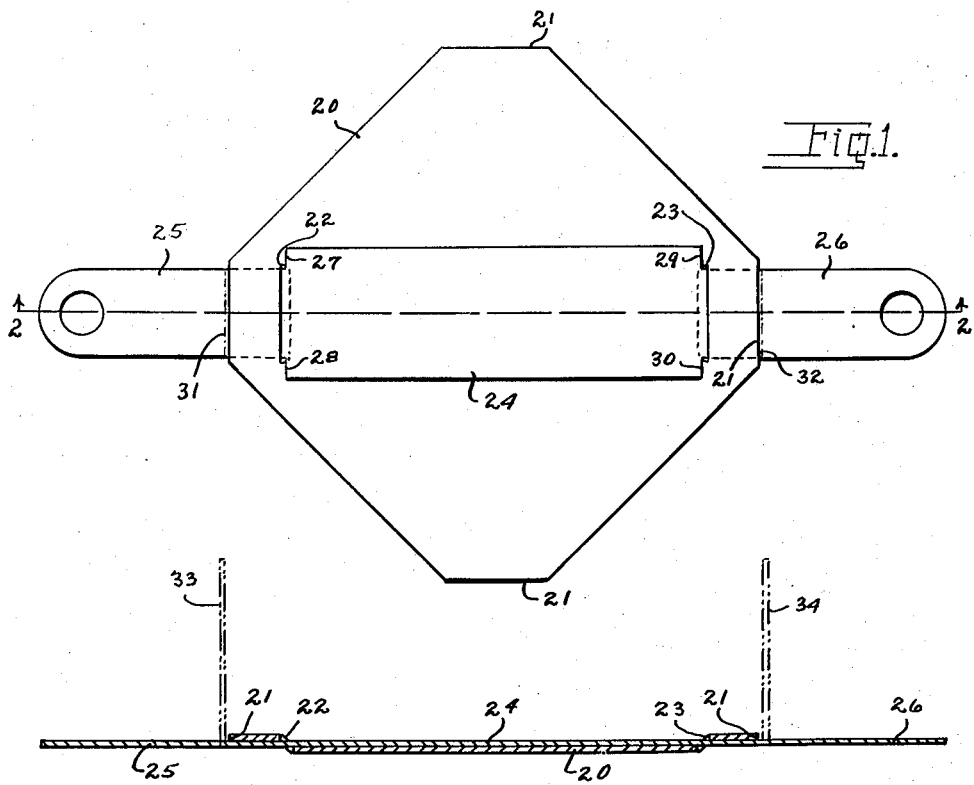
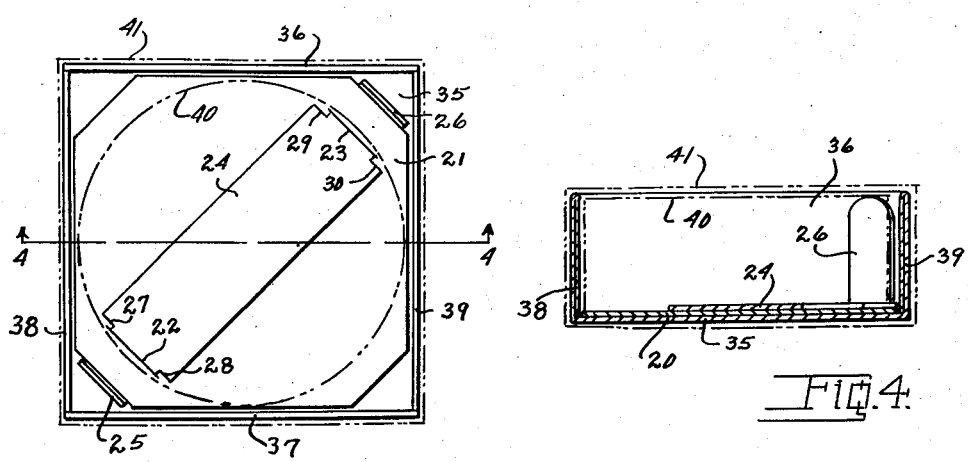
INVENTOR.
WILLIAM P. FRANKENSTEIN
BY
Joseph A. Rave
Attorney July 28, 1959 W. P. FRANKENSTEIN 2,896,834
CAKE LIFT
Filed Sept. 28, 1953 3 Sheets-Sheet 2
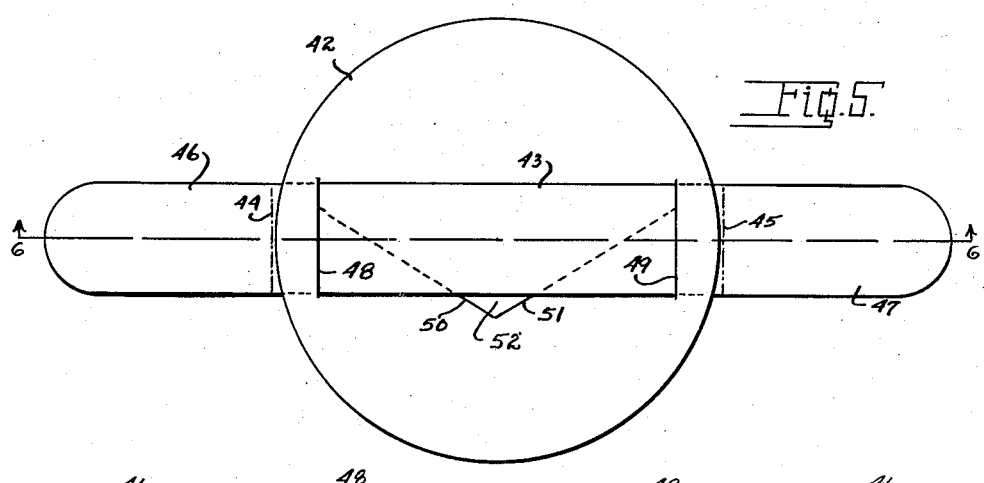
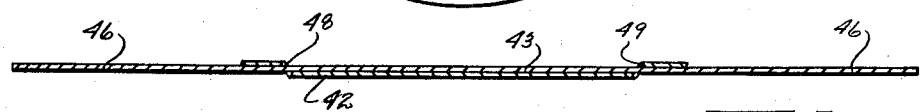
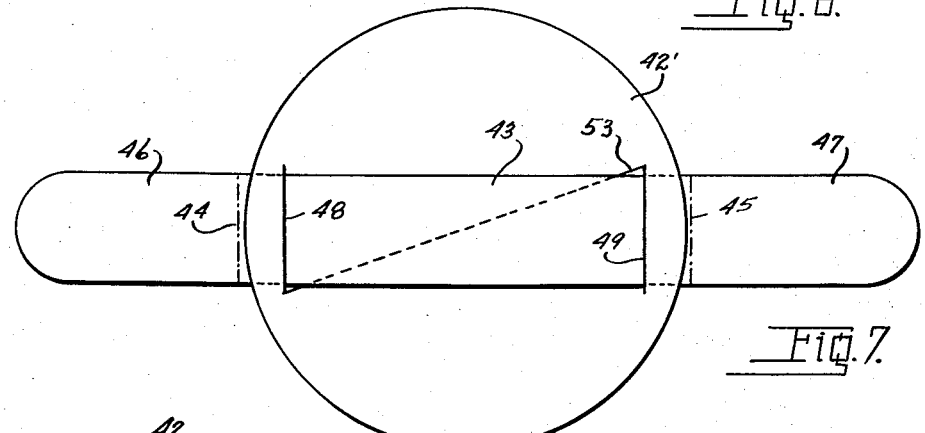
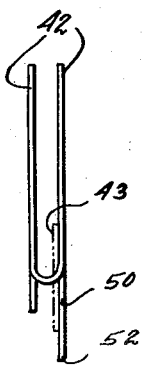
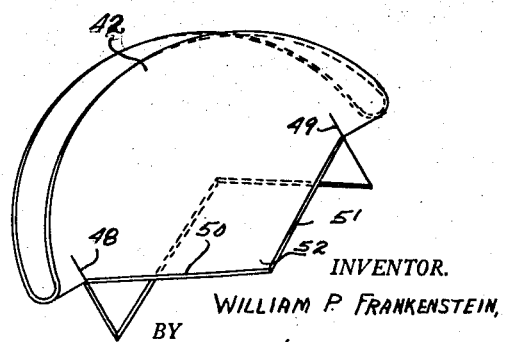
INVENTOR.
WILLIAM P. FRANKENSTEIN,
BY
Joseph A. Rare
Attorney July 28, 1959 W. P. FRANKENSTEIN 2,896,834
CAKE LIFT Filed Sept. 28, 1953 3 Sheets-Sheet 3

INVENTOR.
WILLIAM P. FRANKENSTEIN
BY
Joseph A. Rave
Attorney

United States Patent Office 2,896,834
Patented July 28, 1959

2,896,834

CAKE LIFT

William P. Frankenstein, Cincinnati, Ohio

Application September 28, 1953, Serial No. 382,549

1 Claim. (Cl. 229—30)

This invention relates to improvements in a cake lift and thereby providing an improved cake package.

The device of the present invention is for use with frosted or decorated cakes as produced in commercial bakeries, particularly, for inserting said frosted or decorated cakes into and removing same from a four-sided box or carton. In use the cake lift, as well as the cake itself, is below the upper end of the box or carton so that said carton may be machine wrapped in transparent material without damaging the cake decoration.

The improved cake lift of the present invention discloses an improvement on the cake lift disclosed in applicant's pending application, Serial No. 369,885 filed July 23, 1953, now Patent No. 2,783,932.

In the past, cake lifts have been made from a single blank thereby requiring a relatively large amount of board or other material in order that a body portion and lifting arms may be provided. In producing said cake lift from a single blank a large amount of board was wasted in providing, as noted above, the lift arms. In reducing material from which the cake lift may be made from a single blank, it was necessary to manually fold the arms relative to the cake lift body portion.

The cake lift of the present invention is provided to overcome the objections to the excess material of a unitary blank and avoid the folding of the blank where the same is produced from a minimum amount of material. This result was obtained by producing the cake lift from two or more blanks, one blank supplying the cake body portion and the other the lift arms and which blanks are interconnected in a simple and expeditious manner.

The principal object of the present invention is, therefore, the provision of a cake lift comprising a body portion and lift arms which together provide the cake lift at a minimum of expense and usable with a minimum of effort.

Another object of this invention is the provision of a cake lift that accomplishes the foregoing object and is provided from a plurality of blanks that cooperate with one another in producing a unitary structure for accomplishing its purpose.

A still further object of the present invention is the provision of a cake lift that may be produced from a minimum amount of material and arranged for use in a minimum amount of time.

Other objects and advantages of the present invention will be readily apparent by reference to the following specification considered in conjunction with the accompanying drawings forming a part thereof, and it is to be understood that any modifications may be made in the exact structural details there shown and described, within the scope of the appended claim, without departing from or exceeding the spirit of the invention.

In the drawings:

Fig. 1 is a plan view of a cake lift embodying the principles of the present invention.

Fig. 2 is a longitudinal sectional view through the cake lift of Fig. 1 as seen from line 2—2 on said Fig. 1.

Fig. 3 is a top plan view of an open upper end box having disposed therein the cake lift of the present invention.

Fig. 4 is a vertical sectional view through Fig. 3 as seen from line 4—4 on said Fig. 3.

Fig. 5 is a top plan view of a second form of a cake lift embodying the principles of the present invention.

Fig. 6 is a longitudinal sectional view through the cake lift of Fig. 5 as seen from line 6—6 on said Fig. 5.

Fig. 7 is a top plan view of a further modification of a cake lift embodying the principles of the present invention.

Fig. 8 is a perspective view of the body portion of a cake lift, such as illustrated in Figs. 5 and 7, specifically, that illustrated in Fig. 5, arranged to have assembled therewith the lifting arms for completing the cake lift.

Fig. 9 is an end view of the cake lift body portion of Fig. 8.

Throughout the several views of the drawings, similar reference characters are employed to denote the same or similar parts.

Figure 10:
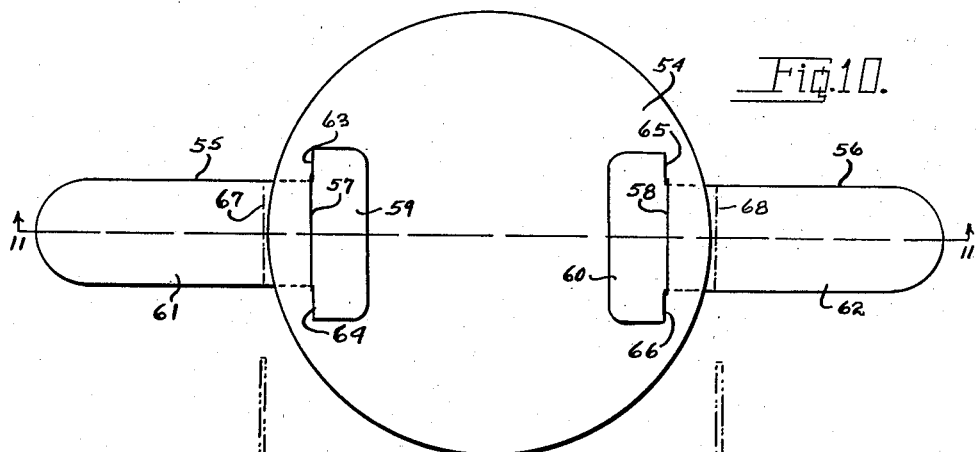
Fig. 10 is a top plan view of a further modification of a cake lift embodying the principles of the present invention.

As illustrated in the drawings several modifications of the invention are illustrated, each, however, formed from two or more separate blanks; which upon assembly cooperate in providing a cake lift that is sturdy and functions for inserting and removing a cake from the enclosing shipping container or carrying box. Each of the modifications will be described in succession in so far as they differ from the other modifications.

Specifically and referring to Figs. 1 and 2, the cake lift there illustrated comprises a body member 20 substantially rectangular in plan and with its four corners removed as at 21 so as not to materially interfere in inserting the cake lift in a four-sided box or carton, since the body member 20 is of an area substantially equal to the area of the box bottom as will subsequently be made clear. The body member 20 of the cake lift is provided inwardly of two of its diametrically opposed corners with elongated apertures 22 and 23 which parallel the edges of the adjacent corner cuts 21.

Cooperating with the cake lift body member 20 is a second blank substantially rectangular in plan and of considerably greater length than the length of the body member 20 across two of its opposed corners as measured between said opposed corner cuts 21. This second blank comprises a central body portion 24 of a length substantially equal to the distance between the cake lift body member elongated apertures 22 and 23. Extending from opposite ends of the central body portion 20 is a lift arm, respectively indicated at 25 and 26, each of which is of less width than the central portion 24 thereby providing at the end of the said central body portion from which lift arm 25 extends shoulders 27 and 28, and likewise providing shoulders 29 and 30 at the end of the second blank central body portion 24 from which the lift arm 26 projects. The outer ends of the lift arms 25 and 26 may be provided with any suitable or desirable contour, such as illustrated in the drawings, which is merely a rounding of the outer ends of said arms, and the said lift arms may be provided with apertures as illustrated in Fig. 1.

In assemblying the cake lift body member 20 and the lift arms blank, the lift arms 25 and 26 are downwardly passed through the apertures 22 and 23 so that the central body portion of the lift arm blank is disposed on the upper surface of the first blank or body member 20 and with the shoulders 27 and 28 of the lift arms blank contacting or abutting the said body member 20 beyond its elongated aperture 22 and with its shoulders 29 and 30 likewise contacting the body member 20 beyond the elongated aperture 23 for thereby limiting the movement of the lift arms blank with respect to the body member blank and at the same time locking the blanks to one another. The lift arms beyond the central body portion 24 underlie the body member 20 to project beyond the corner cut lines 21 that are adjacent the elongated apertures 22 and 23, At about the point where the lift arms 25 and 26 project from the corner cut lines 21 the said arms are respectively provided with a score or fold line 31 and 32.

The user after placing a cake on the cake body member 20 after the assembly of the blanks upwardly bends the said lift arms 25 and 26 on the score or fold lines 31 and 32 to upstand as illustrated in phantom lines at 33 and 34 in Fig. 2. The cake, through its lift, is now ready for insertion into its container or box.

A container and assembled cake lift are illustrated in Figs. 3 and 4 and as there shown, the container, a box, is provided with a bottom 35 from opposite edges of which upstands walls 36 and 37 while from the remaining opposite edges of which bottom 35 upstands similar walls 38 and 39 with adjacent ends of said walls interlocked or connected in any suitable or desirable and well-known manner. It will be noted that the container has its upper end open and disposed on the box bottom 35 is the cake lift body member 20 with the upstanding lift arms 25 and 26 disposed in diagonally opposite corners.

Disposed on the cake lift body member 20, and illustrated in phantom lines 40, is a cake which has a diameter substantially equal to the transverse dimensions of the cake lift body member 20. It will be further noted that with this construction space is provided between each of the cake lift arms 25 and 26 and the adjacent surface of the cake as well as additional space between the opposite faces of the lift arms and their corners and into which spaces the user's fingers may be inserted for grasping said lift arms and raising and lowering the cake and without in anywise interferring with the frosting or other decoration on the cake.

By reference to Fg. 4 it will be noted that the cake as well as the upper ends of the lift arms, only one being illustrated, are below the upper edge of the box side walls wherefore a suitable wrapping, illustrated in phantom lines at 42, may be placed around the cake box and its contents.

It will be appreciated that the blank forming the cake lift body 20 is merely a rectangular piece of cardboard or other material and that it takes a minimum amount of material to produce same as there are no protuberances of any sort around which waste material is located. It will be further noted that the second blank is likewise substantially nothing more than a rectangular blankw ith a minimum of waste material along the sides of the lift arms and which is necessary in order to provide the interlocking shoulders thereon.

The modification illustrated in Figs. 5 and 6 comprises two blanks, the first of which forms the cake lift body member 42, here illustrated as circular in plan instead of rectangular as is the body 20 of the cake lift of Figs. 1 and 2. It should be noted that the cake lift body of Figs. 1 and 2 could be made circular instead of rectangular since the cake lift body need be of an area only sufficient to support a cake, such as 40 in Figs. 3 and 4.

Cooperating with the cake lift body member 42 is a second blank illustrated in Fig. 5 as having parallel sides throughout its length and including a central body portion 43 having its ends defined by score or fold lines 44 and 45 and through which score or fold lines are, respectively, hingedly connected lift arms, per se, 46 and 47.

The connection of the blanks with one another is effected in a different manner than were the blanks of Figs. 1 and 2 wherefore the lift body 42 is provided inwardly of two opposed points on its perimeter with slits 48 and 49, each having a length slightly in excess of the width of the second blank central body portion 43. Extending from each of the slits 48 and 49 is a downwardly inclined slit 50 and 51, with said slits converging and with slit 50 extending from slit 48 and said slit 51 extending from slit 49 and with said inclined slits intersecting at a point centrally of the blank for thereby providing in the lift body 42 a tongue 52 somewhat diamond shaped and which diamond shaped tongue may be said to project from the upper portion of the lift body 42 with said lower portion of the lift body having a complementary diamond shaped recess therein.

In order that the lift arms blank and lift body member blank be connected with one another it is only necessary that the lift body member blank 42 be temporarily bent as illustrated in Fig. 8 whereupon the lift arms blank is placed on the tongue 52 with one longitudinal edge thereof inserted into the slits 48 and 49 that are over the tongue as illustrated in Fig. 9 in phantom lines. The lift body blank 42 is then unbent to its normal position which will dispose the tongue 52 and the portions outwardly of the recess of the lower portion of the lift body 42 below the lift arms blank body portion and with the portions of said body member 42 outwardly of the slits 48 and 49 above the said lift arms blank, as illustrated in Figs. 5 and 6. The lift arms 46 and 47 are then bent upwardly so that the lift body member 42 with its cake may be inserted into a container or box in the same manner as above set forth.

By this construction there is provided clearance between the cake and the lift arms when in normal position. The operator, however, will have to slightly outwardly actuate said arms into the diagonal corners of the container in order to grasp the same without contacting the said cake or its covering.

The modification in Fig. 7 instead of having a slit extending from each of the vertical slits 48 and 49 and diverging with respect to one another, merely has a single slit 53 which joins the lower end of the vertical slit 48 with the upper end of the opposed vertical slit 49. By this construction there is provided a cake lift body member 42' which has an upper and a lower portion each similarly formed and each with a complementary tongue and recess.

The lift arms blank of Fig. 7 is identical with that of Figs. 5 and 6 and the said lift arms blank is assembled with the lift body 42' in the same manner as the parts of Figs. 5 and 6 are assembled and as illustrated in Figs. 8 and 9.

It should be noted that after the cake has been disposed on the cake lift body member 42 or 42' the weight thereof retains the parts in close contact and prevents any possible malformation of the parts while in use and prevents any folding of the said lift bodies 42 or 42' to the position such as illustrated in Figs. 8 and 9.

Figure 11:
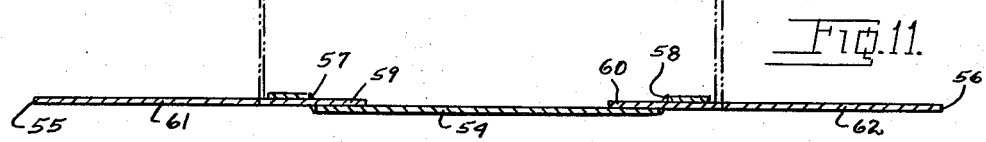
Fig. 11 is a longitudinal sectional view through the cake lift of Fig. 10 as seen from line 11—11 on said Fig. 10.

The modification illustrated in Figs. 10 and 11 comprises three blanks, one for the cake lift body member 54 and a separate blank for each of the cake lift arms and respectively identified by reference numerals 55 and 56.

The cake lift body member 54, similar to the cake lift body member 20 of Figs. 1 and 2, is provided at two diametrically opposite points with a slit 57 and 58 and respectively through which the lift arm blanks 55 and 56 project.

The said lift arm blanks 55 and 56 are respectively provided with an inner enlarged end 59 and 60 from which the lift arm portions, respectively, 61 and 62 project. The lift arm portions 61 and 62 are respectively of less width than their inner end portion thereby providing in the lift arm blank 55, on each side of its lift arm portion 61, a shoulder 63 and 64, and similarly providing in the lift arm blank 56, shoulders 65 and 66 on the sides of the lift arm 62. The shoulders 63 and 64 are adapted to engage the lift arm body portion 54 outwardly of the slit 57 while the lift arm blanks shoulder 65 and 66 are likewise adapted to engage the body portion outwardly of the slit 58.

The assembling of the blanks is believed obvious from Figs. 10 and 11 and, as noted above, the blank 55 has its portion 61 passed downwardly through the slit 57 so that its enlarged inner end 59 rests on the upper surface of the lift body 54 and has its lift arm portion 61 extending beneath the portion of the lift body member 54 outwardly of its slit 57. At about the point where the lift arm 61 projects from beneath the lift body member 54 it is provided with a score or fold line 67 on which it may be upwardly disposed as illustrated in phantom lines in Fig. 11. The lift arm blank 56 is similarly arranged with respect to the lift body member 54 and it is provided with a score or fold line 68 on which it is folded to upstand as illustrated in phantom lines in Fig. 11.

The mounting on the cake lift body member 54 of the lift in Figs. 10 and 11 is simultaneously on the lift arm blanks enlarged end portions 59 and 60 and the weight of the cake assists in retaining the said blanks in operative positions during use.

The modification illustrated in Figs. 12 to 15 results in a pair of blanks each including a portion of the cake lift body member and a lift arm. The first blank comprises a rectangular body member portion 69 having substantially centrally thereof a slot 170. Extending from one edge of the body member 69 is the lift arm 71 having adjacent the body member 69 a score or fold line 72.

Figures 14, 15:
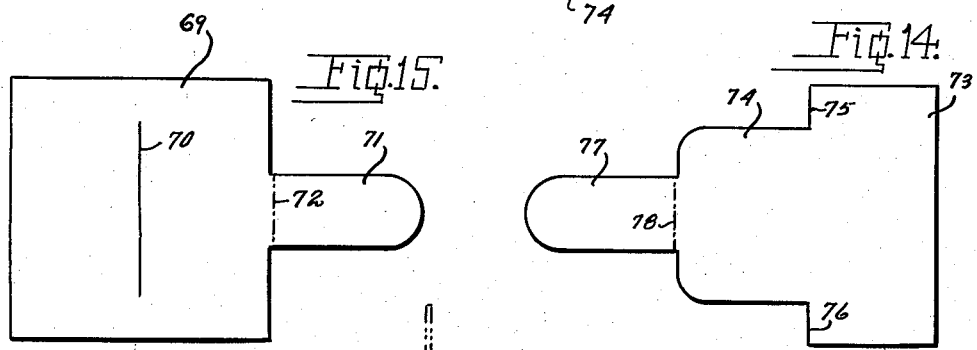
Fig. 14 is a plan view of one of the blanks embodied in the cake lift of Fig. 12.
Fig. 15 is a plan view of a second blank embodied in the cake lift of Fig. 12.

The second blank, illustrated in Fig. 14, is likewise provided with a body member portion 73 with however substantially one-half thereof reduced as at 74 thereby providing shoulders 75 and 76. Extending from the reduced body member portion 74 is a lift arm 77 having, substantially adjacent the said body portion 74, a score or fold line 78.

Figure 12:
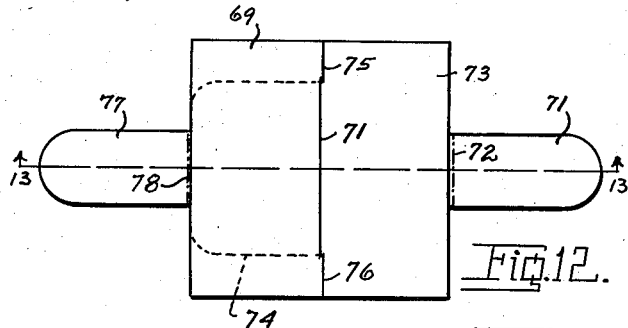
Fig. 12 is a top plan view of a further modification of the cake lift embodying the principles of the present invention.
Figure 13:
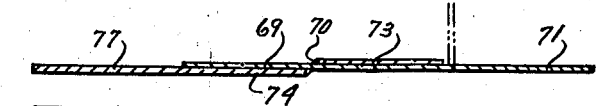
Fig. 13 is a longitudinal sectional view through the cake lift of Fig. 12 as seen from line 13—13 on said Fig. 12.

The blanks of this modification are connected with one another by inserting the lift arm 77 and reduced body member portion 74 of the blank of Fig. 14 through the slit 70 of the blank of Fig. 15 until the shoulders 75 and 76 engage the lift body member 69 outwardly of the said slit 70. With the parts in these positions, the lift arms 71 and 77 project outwardly of the lift body member which is now composed of superimposed body member portions 69, 73 and 74, all as is illustrated in Figs. 12 and 13. The lift arms 71 and 77 may now be upwardly bent as illustrated in phantom lines for lift arm 71 in Fig. 13.

From the foregoing it will now be appreciated that there has been provided a cake lift formed of two or more blanks with each blank cut and formed in such a manner that waste material is reduced to an absolute minimum. It will be further noted that the blanks are readily interlocked with one another in producing the assembled cake lift and that the said blanks so cooperate with one another in connection with the cake disposed on the lift body member, that a structure results that is not readily disassociated while in use.

What is claimed is:

In a cake lift formed of two blanks, the first blank providing the cake lift body member substantially rectangular in plan and of an area at least as great as the cake to be lifted thereon and with, at least, two opposite corners of the blank biased with respect to the adjacent sides, said cake lift body portion having a slit formed therein inwardly of each of said two opposite biased corners, said second blank providing the lift mechanism and including a central body portion of a length substantially equal to the distance across the aforementioned cake lift body member opposite biased corners, said second blank outwardly of its central body portion having integrally, hingedly, connected therewith lift arms with each lift arm having width and a length substantially equal to the height of the cake on the cake lift body member, said second blank central body portion having ends inwardly of each of the lift arms integral, hinge connections of a width substantially equal to the width of said lift arms and the remaining portion of the second blank central body portion of a width substantially greater than the width of the end portions thereof providing radial shoulders at the inner ends of said central body portion ends, said blanks being operatively connected with one another by the projection of said second blank central body portion end portions through the cake lift body member slits to have the radial shoulders outwardly of said slits.

References Cited in the file of this patent
UNITED STATES PATENTS

| | | |
|---|---|---|
| 1,032,053 | Fallon | July 9, 1912 |
| 1,596,521 | Farnham | Aug. 17, 1926 |
| 1,823,055 | Magill | Sept. 15, 1931 |
| 1,927,435 | Derst | Sept. 19, 1933 |
| 1,985,516 | Parr | Dec. 25, 1934 |
| 2,051,512 | Bergquist | Aug. 18, 1936 |
| 2,330,347 | Elliott | Sept. 28, 1943 |